US011599939B2

(12) United States Patent
James et al.

(10) Patent No.: US 11,599,939 B2
(45) Date of Patent: Mar. 7, 2023

(54) SYSTEM, METHOD AND COMPUTER PROGRAM FOR UNDERWRITING AND PROCESSING OF LOANS USING MACHINE LEARNING

(71) Applicant: HSIP Corporate Nevada Trust, Carson City, NV (US)

(72) Inventors: Joseph Plapprumbil James, Atlanta, GA (US); Sandeep Prabhakara, Piscataway, NJ (US)

(73) Assignee: HSIP Corporate Nevada Trust, Carson City, NV (US)

( * ) Notice: Subject to any disclaimer, the term of this patent is extended or adjusted under 35 U.S.C. 154(b) by 466 days.

(21) Appl. No.: 16/280,406

(22) Filed: Feb. 20, 2019

(65) Prior Publication Data

US 2020/0265512 A1    Aug. 20, 2020

(51) Int. Cl.
*G06Q 40/02* (2012.01)
*G06K 9/62* (2022.01)
*G06N 20/20* (2019.01)

(52) U.S. Cl.
CPC ......... *G06Q 40/025* (2013.01); *G06K 9/6265* (2013.01); *G06N 20/20* (2019.01)

(58) Field of Classification Search
CPC .. G06Q 40/025; G06K 9/6265; G06K 9/6256; G06K 9/6293; G06N 20/20; G06N 20/10; G06N 7/005; G06N 5/003; G06N 3/08; G06N 7/023
See application file for complete search history.

(56) References Cited

U.S. PATENT DOCUMENTS

| 7,310,618 | B2 | 12/2007 | Libman |
| 7,653,592 | B1 | 1/2010 | Flaxman et al. |
| 8,521,631 | B2 | 8/2013 | Abrahams et al. |

(Continued)

FOREIGN PATENT DOCUMENTS

| WO | 2011020076 A2 | 2/2011 | |
| WO | WO-2020171857 A1 * | 8/2020 | ........... G06K 9/6256 |

OTHER PUBLICATIONS

J. Heaton, "An empirical analysis of feature engineering for predictive modeling," SoutheastCon 2016, Norfolk, VA, USA, 2016, pp. 1-6, doi: 10.1109/SECON.2016.7506650. (Year: 2016).*

(Continued)

*Primary Examiner* — Bennett M Sigmond
*Assistant Examiner* — Bolko M Hamerski
(74) *Attorney, Agent, or Firm* — BakerHostetler (57) ABSTRACT

A system and method for processing loans includes loan approval decision module that receives input from a loan applicant and collects external data including credit bureau data, bank transaction data, and social media data. The system also includes a machine learning module having a pre-processing subsystem, an automated feature engineering subsystem and a feature statistical assessment subsystem. A business objective determination module and an adverse notice notification module is also provided. The business objective determination module includes a weight optimization company valuation maximization model. A set of models is developed using the machine learning module to predict performance of the borrower based on the business objective determination.

13 Claims, 7 Drawing Sheets

(56) References Cited

U.S. PATENT DOCUMENTS

| | | |
|---|---|---|
| 8,639,618 B2 | 1/2014 | Yan et al. |
| 8,775,300 B2 | 7/2014 | Snowalter |
| 9,449,344 B2 | 9/2016 | Deshpande et al. |
| 10,032,218 B1 | 7/2018 | Denbo |
| 2003/0033241 A1 | 2/2003 | Harari |
| 2006/0059073 A1 | 3/2006 | Walzak |
| 2007/0094060 A1* | 4/2007 | Apps ............... G06F 16/2428 705/7.36 |
| 2011/0161245 A1 | 6/2011 | Hollas |
| 2011/0213730 A1* | 9/2011 | Carty ............... G06Q 10/04 705/348 |
| 2011/0270779 A1 | 11/2011 | Showalter |
| 2011/0302000 A1 | 12/2011 | Dance et al. |
| 2013/0339217 A1 | 12/2013 | Breslow et al. |
| 2015/0032598 A1 | 1/2015 | Fleming et al. |
| 2015/0051957 A1* | 2/2015 | Griebeler ......... G06Q 10/06395 705/7.41 |
| 2015/0170271 A1 | 6/2015 | Orloff et al. |
| 2016/0171600 A1 | 6/2016 | Kay et al. |
| 2017/0068977 A1 | 3/2017 | Mathur et al. |
| 2017/0213280 A1 | 7/2017 | Kaznady |
| 2018/0158139 A1 | 6/2018 | Krajicek et al. |
| 2018/0253657 A1 | 9/2018 | Zhao et al. |
| 2018/0253780 A1 | 9/2018 | Wang et al. |
| 2018/0260891 A1 | 9/2018 | Merrill et al. |
| 2018/0308159 A1 | 10/2018 | Knijnik et al. |
| 2018/0322406 A1* | 11/2018 | Merrill ............... G06N 20/00 |
| 2019/0019213 A1 | 1/2019 | Silberman et al. |
| 2019/0073586 A1* | 3/2019 | Chen ............... G06N 7/005 |
| 2019/0318421 A1* | 10/2019 | Lyonnet ............... G06N 20/20 |
| 2019/0325524 A1* | 10/2019 | Gebara ............ G06Q 10/06375 |
| 2019/0378050 A1* | 12/2019 | Edkin ............... G06N 20/20 |
| 2020/0090003 A1* | 3/2020 | Marques ............... G06F 17/18 |

OTHER PUBLICATIONS

International Patent Application PCT/US2019/058017: International Search Report And Written Opinion dated Jan. 15, 2020, 11 pages.

International Patent Application No. PCT/US2019/058017; Int'l Preliminary Report on Patentability; dated Sep. 2, 2021; 5 pages.

* cited by examiner

SYSTEM, METHOD AND COMPUTER PROGRAM FOR UNDERWRITING AND PROCESSING OF LOANS USING MACHINE LEARNING

TECHNICAL FIELD

The present invention relates to loan processing. More particularly, the invention relates to a method, system, and computer program for automated underwriting and processing loans using machine learning.

BACKGROUND

Individuals frequently require money on short notice for various reasons, such as to quickly repay loans or bills, for emergency situations, to purchase products, etc. There are a variety of different types of loans for borrowers to take out. Mortgages, car loans, payday loans, short term loans, micro loans, personal loans, consolidated loans, and loans from insurance policies are all examples.

Loans may be secured with an asset or unsecured. Unsecured installment loans are short term, unsecured loans extended to borrowers. Repayment is carried out over a predetermined amount of time and the loan is paid back in a series of payments, or installments that go toward the loan. Unsecured installment loans can be considered "high-cost, small-dollar" loans. They usually come with high interest rates and are extended to those who do not have perfect credit scores or are of a specific income level. U.S. consumers borrow nearly $90 billion every year in short-term, small-dollar loans typically ranging from $300 to $5,000. Many banks have withdrawn from this market, resulting in consumers often turning to alternative lenders.

All loans also require lender approval of loan requests. Typically such approval takes time while the lender approves the loan. Delay in approval is a disadvantage in cases where the borrower is looking to obtain the funds quickly. Information requested in a typical loan request may include name, address, age, employment, financial history, credit rating.

In the United States, unsecured installment loans are subject to state and federal regulations. Applicable state regulations include (1) oversight of lending entities; (2) consumer protection by requiring specific disclosures; (3) substantive regulation of lending, including limitations on loan terms such as limits on amount that can be borrowed, restrictions on loan costs or terms or the lending process (such as requiring waiting periods or full documentation underwriting); and (4) use by enforcement officials of broad concepts, such as unfairness or deception, that do not provide specific instruction to lenders as to what they must do to comply with the law.

In the United States, The Consumer Financial Protection Bureau (CFPB) regulates, supervises, and enforces the offering and provision of consumer financial products or services under federal consumer credit laws. The CFPB has authority to issue rules that identify and prevent unfair, deceptive or abusive acts or practices by those who offer financial products or services to consumers.

Two federal laws—the Equal Credit Opportunity Act (ECOA), as implemented by Regulation B, and the Fair Credit Reporting Act (FCRA) require that consumers and businesses applying for credit should receive notice of the reasons a creditor took adverse action on the application or on an existing credit account. Regulation B defines adverse action as: (1) A refusal to grant credit in substantially the amount or on substantially the terms requested in an application unless the creditor makes a counteroffer (to grant credit in a different amount or on other terms), and the applicant uses or expressly accepts the credit offered (2) A termination of an account or an unfavorable change in the terms of an account that does not affect all or substantially all of a class of the creditor's accounts; or (3) A refusal to increase the amount of credit available to an applicant who has made an application for an increase.

Lenders of unsecured installment loans must make lending decisions quickly and in compliance with regulations.

When a potential borrower desires to obtain an unsecured installment loan, the potential borrower is required to complete a loan application. The information requested in the loan application may include financial information such as account records, account balances, loan balances, links to transaction history, or the like, which are of a confidential nature. The information is evaluated by the lender manually or with the assistance of a computer system.

Lenders need confidence that the amount lent can be repaid on time. In that regard lenders will look at a variety of available data sources that provide information about the creditworthiness of a borrower. A typical data source would be a credit bureau, an entity that collects and researches individual credit information and sells it for a fee to creditors so they can make a decision on granting loans. Assessment of the information collected will typically require assessment by a person who will use their judgment in making decisions to approve deny a loan.

There is a need for systems that enable loan approvals and processing quickly, in compliance with state and federal laws and regulations, and without the need for human intervention. There is a need for systems that enable a lender to process a wide variety of information sources that may provide an indication of the ability of a borrower to repay that loan on time. There is a need for systems that assess the impact of a loan decision on the valuation of the lender, and not just on the profit loss statement. There is a need for systems that utilize machine learning using an ensemble of models that assess a variety of information to make approval decisions that maximize the valuation of the lender. There is a need for systems that provide localized linear explanations, such as adverse notices without human intervention. There is a need for loan approval and processing systems that incorporate machine learning with automated feature engineering.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a loan approval decision module that receives input from a loan applicant and collects external data including credit bureau data, bank transaction data, and social media data. The system also includes a machine learning module having a pre-processing subsystem, an automated feature engineering subsystem and a feature statistical assessment subsystem. A business objective determination module and an adverse notice notification module is also provided.

Implementations may include one or more of the following features. The system where the pre-processing subsystem pre-processes the external data by formatting, cleaning, and sampling the external data. The system where the automated feature engineering subsystem is used to transform the external data by scaling, decomposition, and aggregation The system where the business objective determination module includes a weight optimization company valuation maximization model. The system where the machine learning module further includes a machine learning model development module. The system where the automated feature engineering subsystem uses an expert system that automatically generates new features, and determines which algorithms require feature engineering.

One general aspect includes a method including the step of receiving at a lender a loan application from a loan applicant. The method include the steps of collecting external data related to the applicant and pre-processing the external data using a machine learning module to generate processed external data. The method the conducts an automated feature engineering to develop a set of variables that are unique, differentiated and dense. The method the performs a business objective determination on the processed external data to generate an objective function. The objective function is used to develop a the set of variables to create and test a plurality of machine learning models. An ensemble machine learning model is then created from the plurality of machine learning models. The method also includes developing a set of categories mapped to adverse action notices. Other embodiments of this aspect include corresponding computer systems, apparatus, and computer programs recorded on one or more computer storage devices, each configured to perform the actions of the methods.

Implementations may include one or more of the following features. The method where the automated feature engineering transforms the external data through scaling, decomposition and aggregation. The method where the pre-processing includes formatting, cleaning, and sampling the external data. The method where the business objective determination is based on maximizing the value of the lender. The method where the business objective determination takes into account a set of features. These features may include first payment default recovered, return on capital, cost of customer acquisition, cost of maintaining a customer, customer lifetime value, among others. The method further including developing a set of models using a machine learning module to predict performance of the borrower based on the business objective determination. The method where conducting automated feature engineering includes generating new features, and determining which algorithms require feature engineering. The method where the ensemble machine learning model is created by a machine learning model development module.

One general aspect includes non-transitory computer readable media having program instructions including: receiving at a lender a loan application from a loan applicant; collecting external data related to the applicant, and pre-processing the external data using a machine learning module to generate processed external data. The program instructions also include instructions to conduct an automated feature engineering to develop a set of variables that are unique, differentiated and dense. The program instructions also include instructions to perform a business objective determination on the processed external data to generate an objective function, and using the objective function and the set of variables to develop and test a plurality of machine learning models. The program instructions also include instructions to create an ensemble machine learning model from the plurality of machine learning models. The program instructions also include instructions to develop a set of categories mapped to adverse action notices.

Implementations may include one or more of the following features. The non-transitory computer readable media where the automated feature engineering transforms the external data though scaling, decomposition and aggregation. The non-transitory computer readable media where pre-processing includes formatting, cleaning, and sampling the external data. The non-transitory computer readable media where the business objective determination is based on maximizing the value of the lender.

DETAILED DESCRIPTION OF ILLUSTRATIVE EMBODIMENTS

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, etc.) or an embodiment combining software and hardware aspects. These aspects may all generally be referred to as a "module," "system", or "subsystem." Other aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit or in programmable hardware devices. Modules may also be implemented in software for execution by various types of processors. Modules or portions of a module that are implemented in software, may be stored on one or more computer readable storage media. Computer readable storage medium may include an electronic, magnetic, or optical device or any suitable combination thereof.

Figure 1:
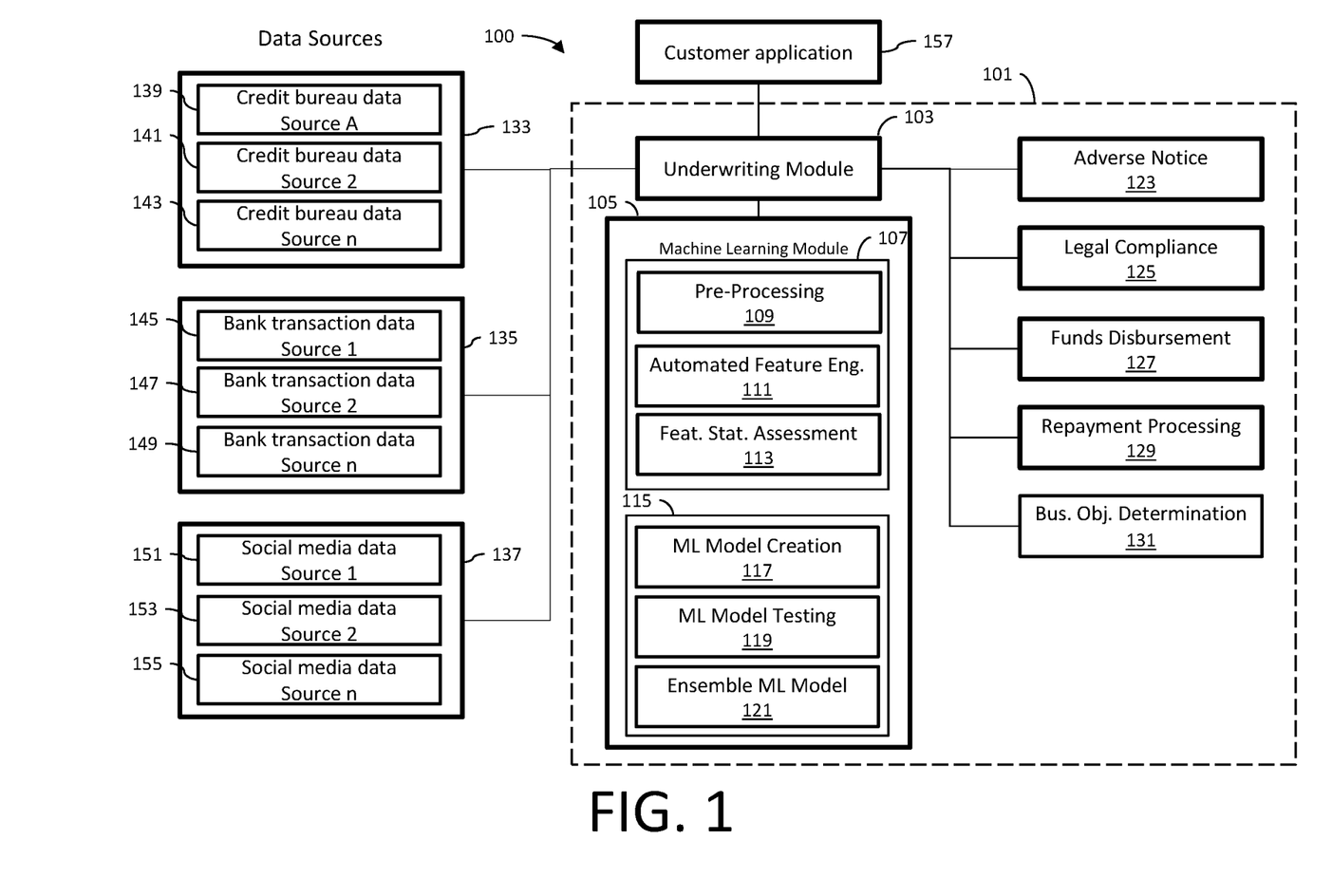
FIG. 1 is a block diagram illustrating an embodiment of a computing environment including a system architecture of a system for approving and processing loans.

FIG. 1 illustrates an environment 100 according to an implementation of the disclosure. The environment 100 may include a loan approval and processing system 101 having an underwriting module 103 and a machine learning module 105. Machine learning module 105 includes a machine learning processing subsystem 107 that may include a pre-processing subsystem 109, an automated feature engineering subsystem 111, and a feature statistic assessment subsystem 113. Machine learning module 105 may also include a machine learning model development module 115 having a machine learning model creation subsystem 117, a machine learning model testing subsystem 119 and an ensemble machine learning model 121. The underwriting module 103 may access an adverse notice subsystem 123, a legal compliance subsystem 125, a funds disbursement subsystem 122, a repayment processing subsystem 129 and a business objective determination subsystem 131. The underwriting module 103 accesses a plurality of data sources including credit bureau data sources 133, bank transaction data sources 135 and social media data sources 137. Other sources of data that may provide insights on the ability of the borrower to repay a loan on time may be accessed. Credit bureau data sources 133 may include a plurality of individual credit bureau data sources such as credit bureau data source A 139, credit bureau data source B 141 and credit bureau data source n 143. The bank transaction data sources 135 may include man transaction data source A 145, bank transaction data source B 147, and bank transaction data source n 149. The social media data sources may include social media data source A 151, social media data source B 153, and social media data source n 155. The loan approval and processing system 101 will also receive input from a customer application subsystem 157.

The underwriting module 103 automatically decides whether to approve the loan based on information received from customer application 157, credit bureau data sources 133, bank transaction data sources 135, social media data sources 137 and other data sources. The automatic decision of loan approval is made using machine learning module 105. The underwriting module 103 may select one or more recommended actions based on one or more machine learning results. The underwriting module 103 may select or recommend an action based on a confidence metric associated with the action. For example, the underwriting module 103 may select a recommended action with a highest confidence metric, a highest average confidence metric based on multiple confidence metrics, or the like. The underwriting module 103 may select or recommend an action based on an outcome of the action determined by the machine learning module 105. For example, the underwriting module 103 may determine an enterprise value return or another predicted outcome for each action, and the underwriting module 103 may select an action with an optimal outcome, a best outcome, a highest valued outcome, or the like. In certain embodiments, the underwriting module 103 may balance a confidence metric and a predicted outcome for an action, selecting or recommending an action based on both a confidence metric and a predicted outcome for the action.

As described above, in certain embodiments, the underwriting module 103 may recommend an action for data collection associated with one or more non-actionable features. Collecting additional data regarding a non-actionable feature, in one embodiment, may allow the underwriting module 103 to recommend a more optimal action plan for actionable feature.

In embodiments where the machine learning module 105 and/or the pre-processing module 109 collect learning results, the underwriting module 103 may access a results data structure to analyze or process the pre-computed machine learning results to determine one or more recommended actions for loan application. In other embodiments, the underwriting module 103 may receive machine learning results from the machine learning module 105, without saving the results in a results data structure. The results data structure may be indexed or accessible by features, by instances of data, or the like to facilitate access to the results by the recommended action module 204.

Machine learning module 105 pre-processes the data in pre-processing subsystem 109. Pre-processing subsystem 109 pre-processes the data by formatting, cleaning, and sampling the data. The formatting step converts the data into a format that is suitable for use by the machine learning module 105. Cleaning of the data is the removal or fixing of missing data. Sampling of data relates to the selection of a smaller representative sample of the collected data that may be much faster for exploring and prototyping solutions before considering the whole data set. For example, the pre-processing subsystem 109 may process or analyze different instances of data, such as historic customer data, simulated data, projected data, estimated data, and/or a combination of several of the above. Pre-processing subsystem 109 may determine simulated, estimated, or projected data to fill-in or complete data from a user based on the data from the user, by recognizing patterns in the data, fitting one or more functions to the data, or the like. The pre-processing subsystem 109 may fill in missing data using permutations of the missing data (e.g., each possible data value, each value at fixed increments between minimum and maximum values, or the like).

Machine learning algorithms need processed data in order to work. The machine learning algorithms only make predictions from numeric data. This data is composed of relevant variables, known as "features." Features are typically measurable attributes depicted by a column in a dataset. For instance, customer datasets often include features like customer id, income, etc. If the calculated features do not clearly expose the predictive signals the utility of the models will be compromised. Feature engineering is the process for extracting numeric features. Thus, feature engineering is the process of transforming raw data into features that better represent the underlying problem to the predictive models, resulting in improved model accuracy on unseen data. The automated feature engineering subsystem 111 is used to transform the data and may include the steps of scaling, decomposition, and aggregation. Scaling is desired when the pre-processed data includes certain attributes having scales, such as dollars, time, and the like. There is a need to have data attributes having the same scale for a given feature in order to process the data through the machine learning module 105. Decomposition relates to features that represent a complex concept that may be more useful to a machine learning method when split into the constituent parts. For example, a date may have a day and time components that in turn could split out further. With aggregation features may be aggregated into a single feature that would be more meaningful to the problem the machine learning module 105 is trying to solve.

In feature engineering a dataset is prepared for machine learning by changing features or deriving new features to improve machine learning model performance. For example, suppose a lender wants to predict which loans will go bad. The lender has the borrowers' incomes and the monthly repayment amount of each loan. While these two values are individually predictive of the probability of default, creating a new feature based on the calculation of the loan repayment amounts as a percentage of the borrowers' income may add additional insights and will get the lender an even more accurate model. Automating feature engineering optimizes the process of building and deploying accurate machine learning models. Feature engineering can include: Finding new data sources—e.g. credit scores from an external agency, or applying business rules—e.g. flagging banking transactions that exceed authorization limits, or regrouping or reshaping data.

Automating feature engineering optimizes the process of building and deploying accurate machine learning models. Automation of feature engineering is accomplished by using an expert system that automatically generates new features, determines which algorithms require feature engineering, knows what type of feature engineering works best with each algorithm. For example, in a model that uses the regularized logistic regression algorithm one may automate feature engineering by creating a new column for each possible value of the categorical feature (regularized logistic regression algorithms do not directly accept categorical data for example gender). Similarly regularized logistic regression algorithms do not work with missing numerical values. In the credit risk model for example with a field containing the number of years since the applicant was last declared bankrupt, the field will be empty for most applicants. The automated feature engineering subsystem 111 would know that it should carry out missing values imputation as a feature engineering step. Finally standardizing numeric features (scaling values to lie within the same range) is necessary in regularized logistic regression algorithms, and the automated feature engineering subsystem 111 adds the steps because it knows that this step constitutes best practice.

The feature statistical assessment subsystem 113 provides a statistical analysis of the features developed by the automated feature engineering subsystem 111. Statistical analysis involves collecting and scrutinizing every data sample in a set of items from which samples can be drawn. A sample, in statistics, is a representative selection drawn from a total population. Statistical analysis may include the steps of describing the nature of the data to be analyzed, exploration of the relation of the data to the underlying population, the creation of the model to summarize understanding of how the data relates to the underlying population, the proving or disproving of the validity of the model, and the employment of the predictive analytics to run scenarios that will help guide future actions. The goal of statistical analysis is to identify features that are unique, differentiated, and dense.

Model creation and testing subsystem 115 includes model creation subsystem 117 that creates models and associated algorithms for prediction purposes. Model creation is the task of creating statistical models from a set of candidate models given certain data. Automated model creation selects which predictive modeling technique matches a business problem. Model creation and testing subsystem 115 also includes model testing subsystem 119 that implements automated model testing to verify that derived models remain valid, and triggers relearning of a new model upon model failure. Ensemble machine learning subsystem 121 creates model ensembles. Ensemble learning helps improve machine learning results by combining several models. This approach allows the production of better predictive performance compared to a single model. Ensemble methods are meta-algorithms that combine several machine learning techniques into one predictive model in order to decrease variance (bagging), bias (boosting), or improve predictions (stacking).

An important feature of the present disclosure is the business objective determination module 131 which comprises a weight optimization company valuation maximization model. A "Business Objective" is calculated after taking into account all the factors that are required to understand, calculate, evaluate and maximize the company (lender) or corporate value. Company or corporate valuation is based on a variety of factors including but not limited to investor sentiment, market factors (e.g., private and public market economic indicators (S&P, Dow Jones Index, etc.) investor valuation, short and long term portfolio performance, Key Performance Indicators (e.g., First Payment Default etc.), etc. The Company Valuation Maximization module calculates the "Business Objective" as a linear or non-linear combination of the different factors mentioned above. The weights associated with different factors change often and over time to account for changing market and company conditions and goals. The Underwriting and other modules customize the models in order to maximize the "Business Objective."

Figure 2:
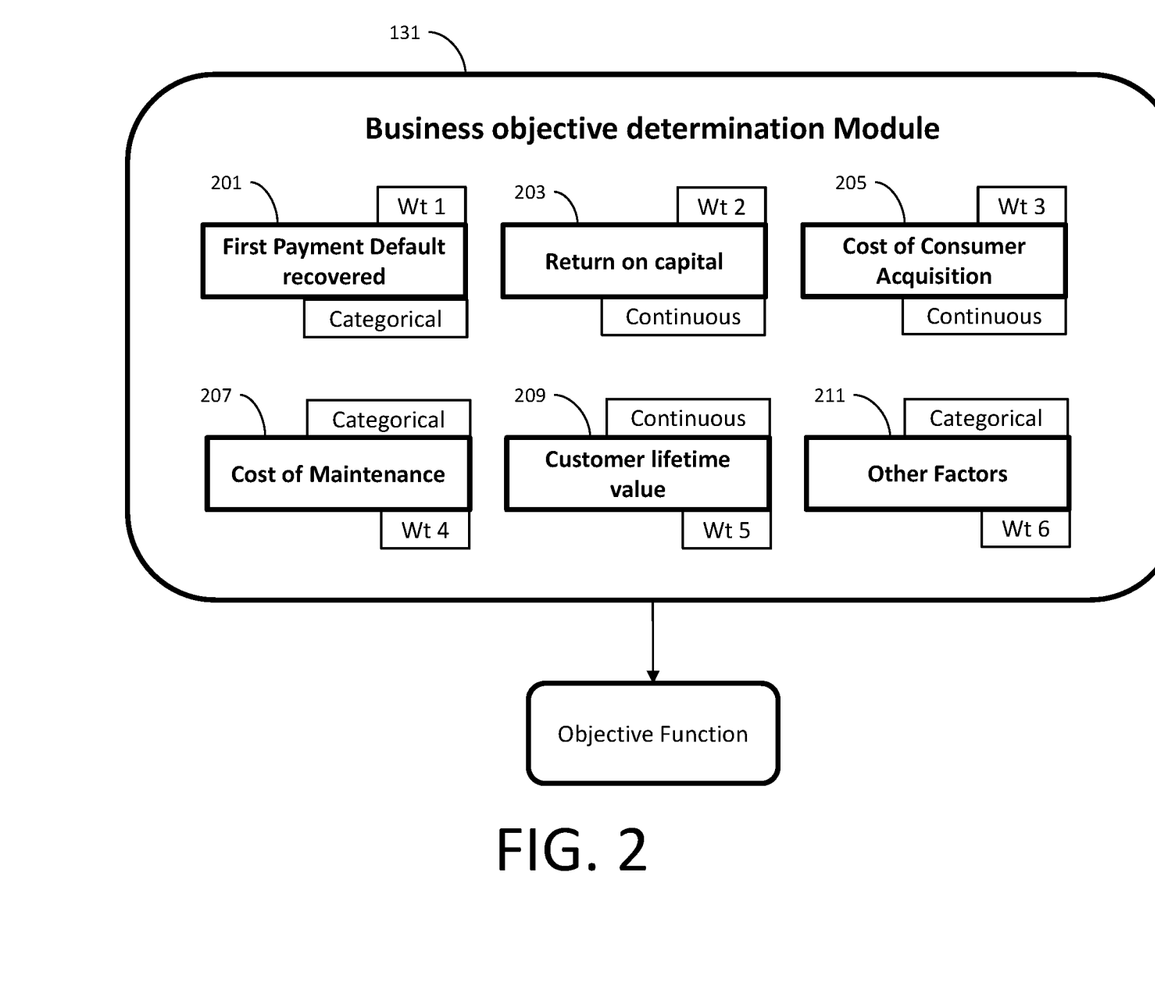
FIG. 2 is a block diagram of a business objective determination subsystem.

As shown in FIG. 2, the business objective determination module 131 weighs a number of features to determine whether a decision by the underwriting module 103 maximizes the lender's valuation though the use of a weight optimization company valuation maximization model. The business objective determination module 131 determines the impact of underwriting decisions on long term enterprise value. For each decision, the business objective determination module 131 calculates a plurality of variables or features (EVM Variables) that affect long term enterprise value and assigns a weight associated with the relevant importance of the variable to long term enterprise value. Among those variables are first payment default recovered (FPD(R)) 201; return on capital (RoC) 203, cost of customer acquisition (CoC) 205; cost of maintenance (CoM) 207, customer lifetime value (CLTV) 209 among other factors 211. Some of these variables are categorical and others are continuous. Quantitative variables can be classified as categorical, discrete or continuous. Categorical variables contain a finite number of categories or distinct groups. Categorical data might not have a logical order. For example, categorical predictors include gender, payment method, etc. . . . . Discrete variables are numeric variables that have a countable number of values between any two values. A discrete variable is always numeric. For example, the number of customer complaints or the number of flaws or defects. Continuous variables are numeric variables that have an infinite number of values between any two values. A continuous variable can be numeric or date/time. For example, the date and time a payment is received.

FPD(R) 201 is a categorical measure that relates to the recovery of a first payment default. First payment default means, as of any date of determination after the effective date, the aggregate outstanding consumer loan principal balance of consumer loans sold by the lender to the borrower that experience a default in the first scheduled consumer loan payment. FPD(R) 201 is a feature indicating whether a first payment default has or has not been recovered.

RoC 203 is a profitability ratio. It measures the return that an investment generates for capital contributors, i.e. bondholders and stockholders. Return on capital indicates how effective a company is at turning capital into profits. The ratio is calculated by dividing the after-tax operating income by the book value of both debt and equity capital less cash/equivalents. RoC 203 is a continuous variable.

CoC 205 is the cost associated in convincing a customer to buy a product/service. This cost is incurred by the organization to convince a potential customer to purchase a product or service. This business metric plays a major role in calculating the value of the customer to the company and the resulting return on capital of acquisition of the customer. The calculation of customer valuation helps a company decide how much of its resources can be profitably spent on a particular customer. In general terms, it helps to decide the worth of the customer to the company.

CoM 207 is the cost and level of effort with maintain a customer. This includes advertising and promotion costs, cost of communicating with the customer, support costs, loyalty programs among other.

CLTV 209 is a prediction of the net profit attributed to the entire future relationship with a customer. The prediction model can have varying levels of sophistication and accuracy, ranging from a crude heuristic to the use of complex predictive analytics techniques. CLTV can also be defined as the monetary value of a customer relationship, based on the present value of the projected future cash flows from the customer relationship. Customer lifetime value is an important concept in that it encourages firms to shift their focus from quarterly profits to the long-term health of their customer relationships. CLTV represents an upper limit on spending to acquire new customers. For example, CLTV may take into account whether a loan customer is likely to request other loans or renew existing loans. CLTV is a continuous variable.

Other features, such as may also be used in determining whether to approve a loan.

Each feature will be accorded a weight to apportion their relative relevance to the impact of a decision on long term enterprise valuation. The collection of weighted variables provides an objective function of long term enterprise valuation.

Figure 3:
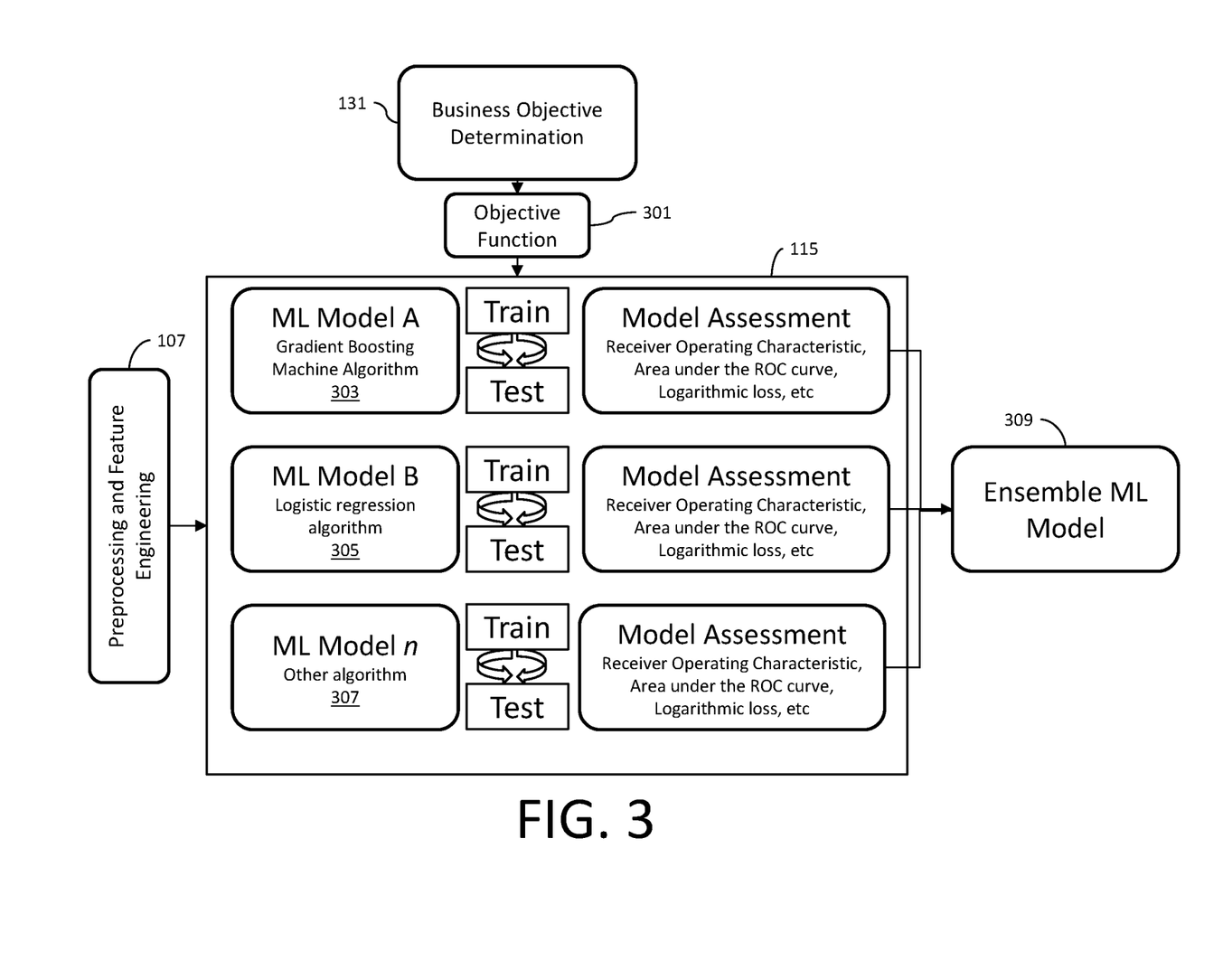
FIG. 3 is a block diagram of a machine learning model development subsystem.

As illustrated in FIG. 3, the relevance of the weighted features (Objective function 301) would be tested by the machine learning model development module 115 using machine learning models (e.g. ML model A 303, ML model B 305 and ML model n 307 implemented by the machine learning module 105. the results of such tests are used to train the machine learning module 105. For example, when input is received from machine learning processing subsystem 107 (Preprocessing and feature engineering), ML model A 303 may use a gradient boosting machine algorithm. Gradient boosting is a machine learning technique for regression and classification problems, which produces a prediction model in the form of an ensemble of weak prediction models, typically decision trees. It builds the model in a stage-wise fashion like other boosting methods do, and it generalizes them by allowing optimization of an arbitrary differentiable loss function. ML model B 305 may use a logistic regression algorithm. Logistic regression is a classification algorithm used to assign observations to a discrete set of classes. Unlike linear regression which outputs continuous number values, logistic regression transforms its output using the logistic sigmoid function to return a probability value which can then be mapped to two or more discrete classes. ML model n 307 may use other algorithms.

Among the machine learning model types are supervised learning/predictive models; unsupervised learning/descriptive models; and reinforcement learning. Predictive models are used to predict the future outcome based on the historical data. Predictive models are normally given clear instructions right from the beginning as in what needs to be learnt and how it needs to be learnt. These class of learning algorithms are termed as Supervised Learning. Unsupervised learning is used to train descriptive models where no target is set and no single feature is considered more important than the other. Example of algorithm used here is: K-means Clustering Algorithm. Reinforcement learning is an example of machine learning where the machine is trained to take specific decisions based on the business requirement with the sole objective of maximizing efficiency (performance). In reinforcement learning the machine/software agent trains itself on a continual basis based on the environment it is exposed to, and applies its enriched knowledge to solve business problems. This continual learning process ensures less involvement of human expertise which in turn saves a lot of time. An example of algorithm used in reinforcement learning is Markov Decision Process. Reinforcement learning involves learning by interacting with an environment. A reinforcement learning agent learns from its past experience, rather from its continual trial and error learning process as against supervised learning where an external supervisor provides examples.

FIG. 3 illustrates various examples of machine learning algorithms that may be used for both supervised and unsupervised learning. While specific examples are illustrated in FIG. 3, any appropriate machine learning algorithm, in light of the subject matter disclosed herein, may be used. For example, classification algorithms may include support vector machines, discriminant analysis, naive Bayes, and nearest neighbor algorithms that be used for supervised learning. Similarly, various regression algorithms such as linear regression, GLM, SVR, GPR, ensemble methods, decision trees, and neural networks may be used for supervised learning. For unsupervised learning, various clustering algorithms may be used such as K-means, K-medoids, fuzzy C-means, hierarchical, Gaussian mixture, neural networks, and hidden markov model, reinforcement learning algorithm—Q learning, etc.

To assess model performance the data can be partitioned into a training set and a validation or test set. Training set used to construct the classifiers and the test set is used to assess their performance. The performance of each classifier on test set is used to obtain an unbiased estimator of the classifier's performance. If a number of classifiers are tested, then in the model selection stage the machine learning model development module 115 can choose the classifier that performed best on the test set. Performance may be determined by using a receiver operating characteristic curve that is created by plotting the true positive rate against the false positive rate at various threshold setting. Accuracy may be measured by the area under the receiver operating characteristic (ROC) curve, which measures accuracy of the model. Yet another testing approach is logarithmic loss that measures the performance of a classification model where the prediction input is a probability value between zero and one. The goal of the machine learning model is to minimize this value. A perfect model would have a log loss of zero.

The goal of the model training and testing is to create an ensemble machine learning model 309. Ensemble models use multiple learning algorithms to obtain better predictive performance than could be obtained from any of the constituent learning algorithms alone. Unlike a statistical ensemble in statistical mechanics, which is usually infinite, a machine learning ensemble consists of only a concrete finite set of alternative models, but typically allows for much more flexible structure to exist among those alternatives. Ensemble learning helps improve machine learning results by combining several models. Ensemble methods are meta-algorithms that combine several machine learning techniques into one predictive model in order to decrease variance (bagging), bias (boosting), or improve predictions (stacking).

Figure 4:
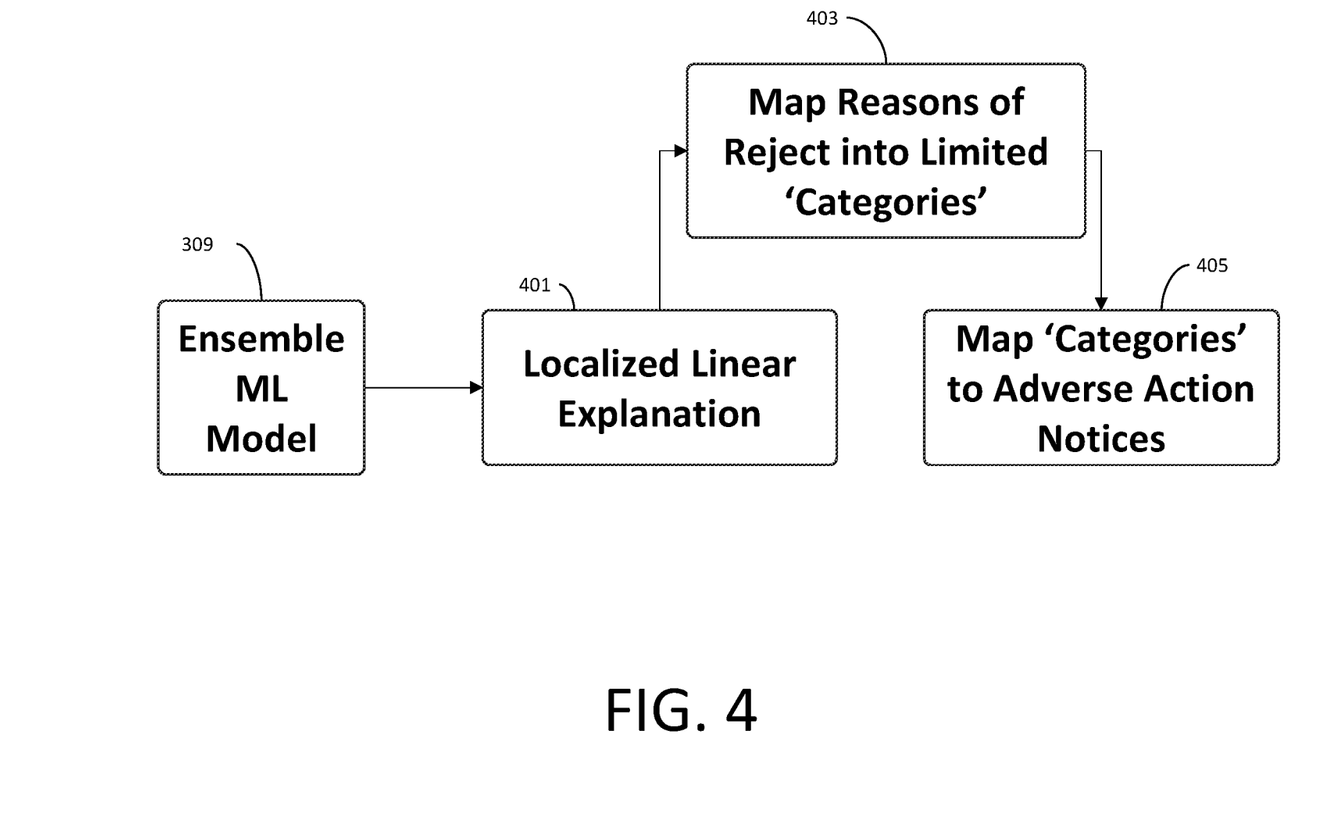
FIG. 4 is a flowchart of a method of providing adverse action notices.

As shown in FIG. 4, the output of the ensemble machine learning model 309 is used to develop a localized linear explanation of the model behavior 401 which is then used to map reasons of rejection into limited categories 403 and finally mapping the categories to adverse action notices. The concept of "Localized Linearity" is used to help map the decision from the underwriting model to adverse action notices. The underwriting models are non-linear, but the further one zooms in on them, the more the decision point around a particular customer is assume to be approximated in a linear fashion. The concept of "Localized Linearity" is applied for all the customers that pass through the underwriting model and need to be mapped to adverse action notices. "Localized Linearity" helps understand the factors that played a role in the decision from the underwriting model; based on those factors, the leads are bucketed into group of adverse action notices that are then sent out.

Figure 5:
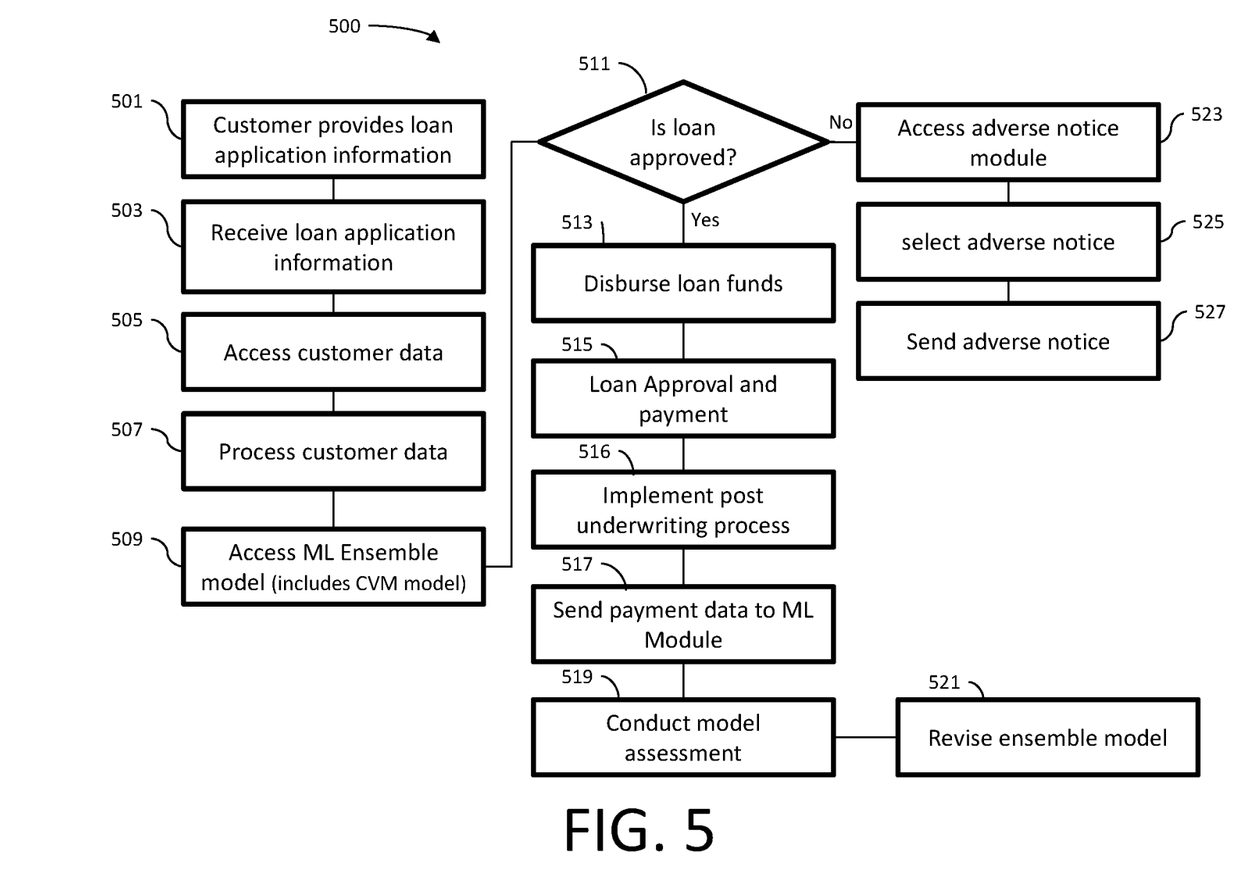
FIG. 5 is a flowchart of a method for underwriting and processing a loan.

FIG. 5 is a flowchart of a method 500 of underwriting and processing short term loans in accordance with an embodiment of the present disclosure.

In step 501, the customer (borrower) provides loan application information to the loan approval and processing system. Loan application information would include the customer name, the customer address, customer phone number, the requested amount of the loan, the reason for the loan request, email address, social security number, date of birth, driver's license number, income, income source, and banking information.

In step 503, the loan approval and processing system receives the loan application information.

In step 505, the loan approval and processing system accesses customer data that may include a plurality of credit bureau reports, bank transactions and social media information, among other information.

In step 507, the loan approval and processing system processes the customer data. This step may include pre-processing the data to: format the data so that it is suitable for use by the machine learning module; clean the data by the removal or fixing of missing data; and sample the data by selecting a smaller representative sample of the collected data.

In step 509, the machine learning ensemble model is accessed. This step includes access to the business objective determination subsystem to determine the impact of the loan transaction on the lenders valuation. Among the features considered for valuation are FPD(R), RoC, CoC, CoM, and CLTV. These features are weighted to represent the impact on the lender valuation.

In step 511, a loan approval determination of is made. The loan approval determination will be based on the impact on lender valuation.

If the loan is approved, in step 513, the loan funds are disbursed. Disbursement may be accomplished by direct deposit to the customer's bank account, or other electronic means.

In step 515, the customer receives the loan approval.

In step 516, the method implements the post underwriting process.

In step 517, the loan approval and processing system sends the payment data to the machine learning module to conduct model assessment and revision. The payment data may include the payment amount, the date of payment, etc.

In step 519, the machine learning module conducts a model assessment to determine if the payment data requires a revision of the ensemble model.

In step 521, if the payment data requires a revision of the ensemble model, the ensemble model is revised.

In step 523, if the loan is not approved, then the loan approval and processing system accesses the adverse notice module.

In step 525, the loan approval and processing system, using the machine learning module, selects the appropriate adverse notice In step 527, the loan approval and processing system sends the adverse notice to the customer.

Figure 6:
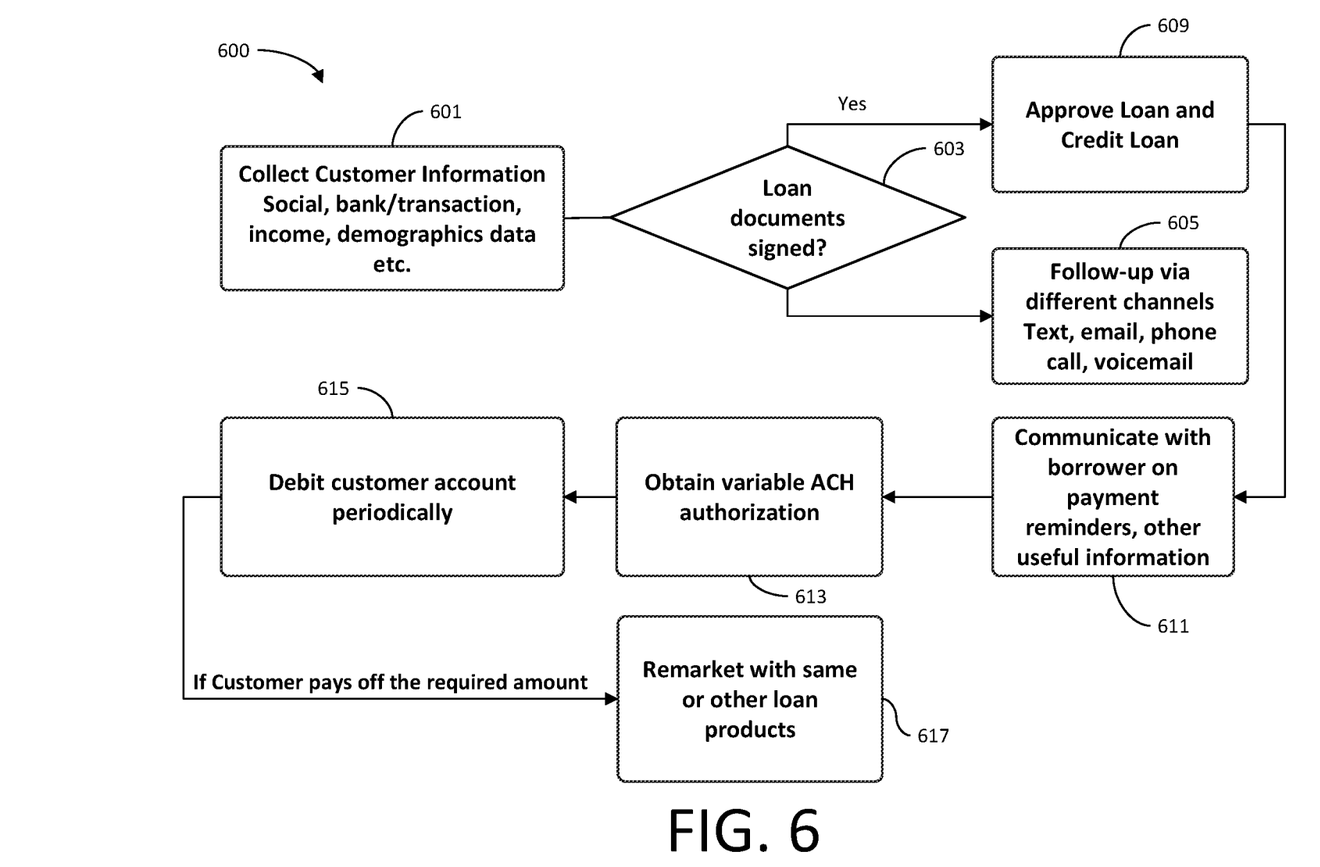
FIG. 6 is a flowchart of a post underwriting process.

Illustrated in FIG. 6 is a flowchart of the post underwriting process.

In step 601 customer information including social media data, bank transactions, income and demographic data is collected.

In step 603 a determination is made of whether the potential borrower (lead) has signed the loan documents.

If the lead does not sign the loan documents, then in step 605 the loan approval and processing system 101 follows up with the lead via different channels, for example text, email, phone call or voice mail. These follow up methods may be automatic.

If the lead signs the loan documents the in step 609, the loan may be approved and the loan funds disbursed.

In step 611, the system automatically communicates with the borrower with payment reminders and other useful information.

In step 613 account authorization such as variable automated clearing house (ACH) authorization is obtained.

In step 615, the borrowers account is debited.

If the Borrower pays off the loan then in step 617 information about remarketing the loan or availability of other loan products is communicated to the borrower.

Figure 7:
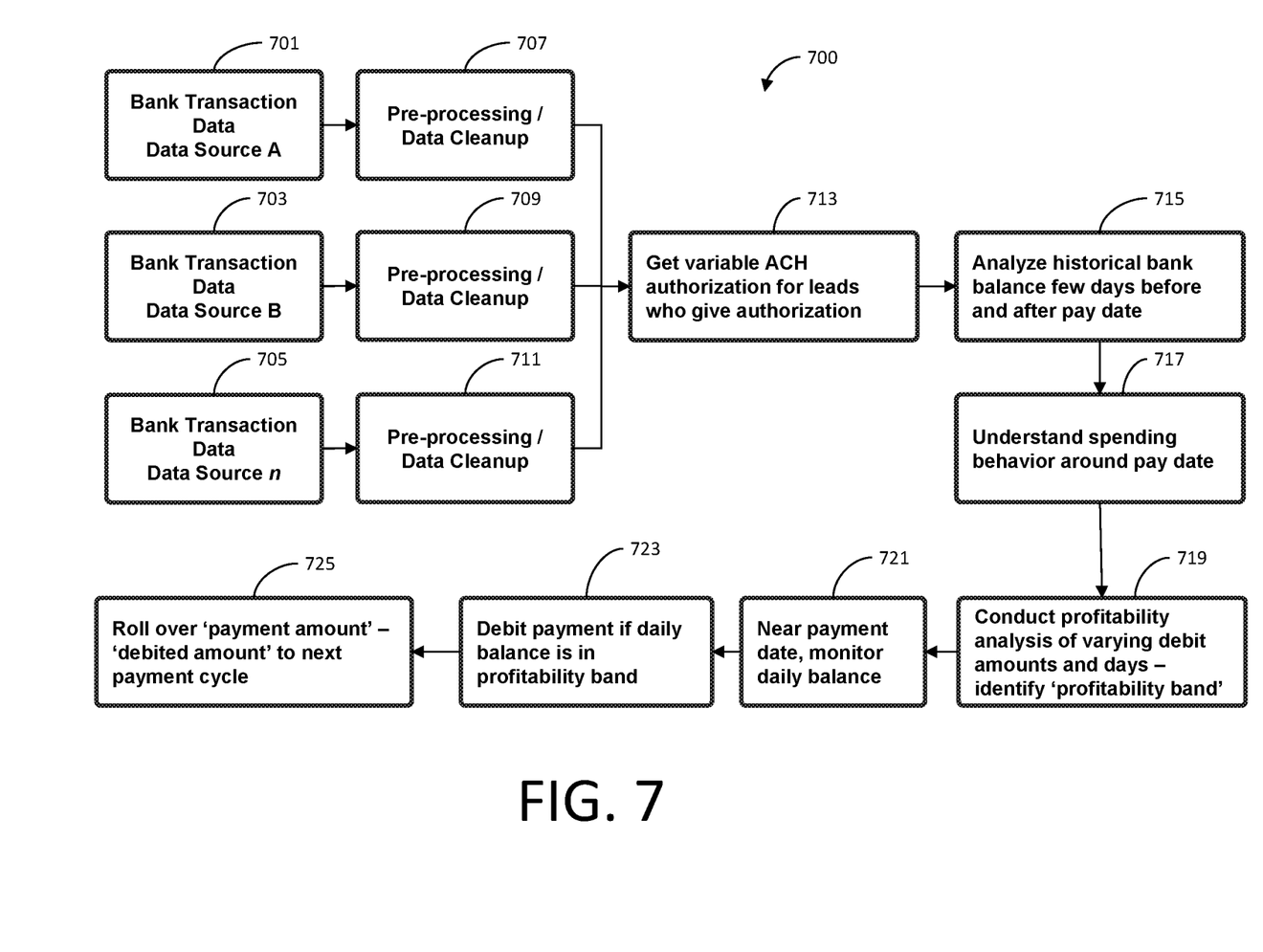
FIG. 7 is a flowchart of an automated dynamic bank debit process based on bank transaction data.

Illustrated in FIG. 7 is a flowchart for a process for automated dynamic bank debit based on bank transaction data 700.

In steps 701, 703 and 705 bank transaction data is collected from data sources A, B and n.

In steps 707, 709, and 711, the bank transaction data is pre-processed and cleaned up.

In step 713 account authorization such as variable ACH authorization is obtained for borrowers (leads) who give authorization.

In step 715, the behavioral finance information is obtained such as transaction history and historical bank balance a few days before and after pay date and analyzed.

In step 717, the spending behavior around the pay date is modeled.

In step 719 a profitability analysis of varying debit amounts and days is conducted to identify a profitability band.

In step 721 the daily balance near the payment date is monitored.

In step 723 if the daily balance is in the profitability band the payment is debited.

In step 725 the payment amount—debited amount is rolled over to the next payment cycle.

Throughout this disclosure, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "module," or "subsystem."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

In view of the foregoing, it will now be appreciated that elements of the block diagrams and flowchart illustrations support combinations of means for performing the specified functions, combinations of steps for performing the specified functions, program instruction means for performing the specified functions, and so on.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed:

1. A method comprising:
   receiving data indicative of a loan application from a loan applicant;
   collecting, based on receiving the data indicative of the loan application, external data related to the loan applicant;
   pre-processing the external data to generate processed external data;
   conducting an automated feature engineering to develop a set of features;
   determining, based on the processed external data, an objective function by calculating values for a plurality of variables representing corresponding business objectives and assigning weights to the plurality of variables;
   creating an ensemble machine learning model from a plurality of machine learning models, wherein at least a portion of the plurality of machine learning models are one or more of trained or selected based on optimizing the objective function;
   varying one or more of the weights over time to account for changes in one or more business conditions;
   updating the ensemble machine learning model based on changes in the objective function corresponding to the varying of the one or more weights;
   determining, based on applying a localized linearity process to the ensemble machine learning model, one or more categories of reasons for rejection mapped to adverse action notices; and
   sending, to a computing device associated with the loan application and based on the mapping of the one or more categories to the adverse action notices, an indication of an adverse action notice.

2. The method of claim 1, wherein the automated feature engineering transforms the external data through scaling, decomposition and aggregation.

3. The method of claim 1, wherein the pre-processing comprises formatting, cleaning, and sampling the external data.

4. The method of claim 1, wherein the optimizing the objective function is based on maximizing the value of a lender associated with the loan application.

5. The method of claim 1, wherein the plurality of variables representing corresponding business objectives comprises one or more of:
   a first payment default recovered,
   a return on capital,
   a cost of customer acquisition,
   a cost of maintaining a customer, or
   a customer lifetime value.

6. The method of claim 1, wherein conducting automated feature engineering comprises generating new features, and determining which algorithms require feature engineering.

7. The method of claim 1, wherein applying the localized linearity process to the ensemble machine learning model comprises linearly approximating, for a particular loan applicant, a non-linearity associated with the ensemble machine learning model to identify the one or more categories of reasons for rejection.

8. The method of claim 1, wherein the indication of the adverse action notice is in compliance with one or more regulations without requiring human review of the adverse action notice.

9. A non-transitory computer-readable medium storing computer-executable instructions that, when executed by one or more processors, cause:
   receiving data indicative of a loan application from a loan applicant;
   collecting, based on receiving the data indicative of the loan application, external data related to the loan applicant;
   pre-processing the external data to generate processed external data;
   conducting an automated feature engineering to develop a set of features;

determining, based on the processed external data, an objective function by calculating values for a plurality of variables representing corresponding business objectives and assigning weights to the plurality of variables;

creating an ensemble machine learning model from a plurality of machine learning models, wherein at least a portion of the plurality of machine learning models are one or more of trained or selected based on optimizing the objective function;

varying one or more of the weights over time to account for changes in one or more business conditions;

updating the ensemble machine learning model based on changes in the objective function corresponding to the varying of the one or more weights;

determining, based on applying a localized linearity process to the ensemble machine learning model, one or more categories of reasons for rejection mapped to adverse action notices; and sending, to a computing device associated with the loan application and based on the mapping of the one or more categories to the adverse action notices, an indication of an adverse action notice.

10. The non-transitory computer-readable medium of claim 9, wherein the automated feature engineering transforms the external data though scaling, decomposition and aggregation.

11. The non-transitory computer-readable medium of claim 9, wherein the pre-processing comprises formatting, cleaning, and sampling the external data.

12. The non-transitory computer-readable medium of claim 9, wherein optimizing the objective function is based on maximizing the value of a lender associated with the loan application.

13. The non-transitory computer-readable medium of claim 9, wherein
the plurality of variables representing corresponding business objectives comprises one or more of:
a first payment default recovered,
a return on capital,
a cost of customer acquisition,
a cost of maintaining a customer, or
a customer lifetime value.

* * * * *